(12) United States Patent
Mutsuno

(10) Patent No.: US 9,821,583 B2
(45) Date of Patent: Nov. 21, 2017

(54) PRINTING DEVICE WITH MIXED SHEET STACKING CONTROL

(71) Applicant: CANON KABUSHIKI KAISHA, Tokyo (JP)

(72) Inventor: Masahiro Mutsuno, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 146 days.

(21) Appl. No.: 14/821,439

(22) Filed: Aug. 7, 2015

(65) Prior Publication Data

US 2016/0052320 A1  Feb. 25, 2016

(30) Foreign Application Priority Data

Aug. 25, 2014  (JP) .................... 2014-170900

(51) Int. Cl.
| | |
|---|---|
| B65H 39/04 | (2006.01) |
| B41L 21/02 | (2006.01) |
| B65H 43/06 | (2006.01) |
| B65H 83/02 | (2006.01) |
| B65H 31/24 | (2006.01) |
| B65H 31/32 | (2006.01) |
| B65H 39/10 | (2006.01) |
| G06F 3/12 | (2006.01) |

(52) U.S. Cl.
CPC .............. *B41L 21/02* (2013.01); *B65H 31/24* (2013.01); *B65H 31/32* (2013.01); *B65H 39/04* (2013.01); *B65H 39/10* (2013.01); *B65H 43/06* (2013.01); *B65H 83/02* (2013.01); *B65H 2220/09* (2013.01); *B65H 2402/10* (2013.01); *B65H 2405/15* (2013.01); *B65H 2405/32* (2013.01); *B65H 2405/3311* (2013.01); *B65H 2511/20* (2013.01); *B65H 2511/51* (2013.01); *B65H 2801/06* (2013.01); *G06F 3/121* (2013.01); *G06F 3/1259* (2013.01); *G06F 3/1282* (2013.01)

(58) Field of Classification Search
CPC ......... B41L 21/02; B65H 31/24; B65H 31/32; B65H 39/04; B65H 39/10; B65H 43/06; B65H 83/02; G03G 5/00
USPC ...................................... 270/58.02
See application file for complete search history.

(56) References Cited

U.S. PATENT DOCUMENTS

| | | | | |
|---|---|---|---|---|
| 5,362,200 A | * | 11/1994 | Ushirogata | ............ B65H 39/11 270/58.14 |
| 5,544,875 A | * | 8/1996 | Obara | .................... B65H 29/00 271/176 |
| 6,168,145 B1 | * | 1/2001 | Tanaka | .................. B65H 39/11 270/58.09 |

(Continued)

FOREIGN PATENT DOCUMENTS

JP   2009-269303 A   11/2009

*Primary Examiner* — Patrick H Mackey
(74) *Attorney, Agent, or Firm* — Fitzpatrick, Cella, Harper & Scinto

(57) ABSTRACT

A technique by which when printing is initiated, printed sheets remaining in a large-volume stacker and sheets printed in a subsequent job are not mixed in the large-volume stacker is provided. A printing system in which a printing apparatus and a post-processing apparatus for receiving a sheet printed by the printing apparatus and performing post-processing are connected, upon activation of the printing system, when detecting that a sheet is stacked in the post-processing apparatus, instructs the processing apparatus to discharge the remaining sheet.

8 Claims, 10 Drawing Sheets

(56) References Cited

U.S. PATENT DOCUMENTS

| | | | | |
|---|---|---|---|---|
| 6,695,302 B1 * | 2/2004 | Lamothe | ............ | B65H 29/18 |
| | | | | 271/214 |
| 6,988,721 B2 * | 1/2006 | Ingelsten | ............ | B65H 29/24 |
| | | | | 270/52.09 |
| 7,296,791 B2 * | 11/2007 | Kurahashi | ............ | B42C 19/02 |
| | | | | 271/176 |
| 7,891,661 B2 * | 2/2011 | Obuchi | ............ | B65H 31/12 |
| | | | | 271/214 |
| 7,900,904 B2 * | 3/2011 | Herrmann | ............ | B65H 31/24 |
| | | | | 270/52.14 |
| 8,047,543 B2 | 11/2011 | Toriyabe et al. | | |
| 8,152,162 B2 * | 4/2012 | Obuchi | ............ | B65H 29/041 |
| | | | | 271/198 |
| 8,356,967 B2 * | 1/2013 | Gammerler | ............ | B65G 57/11 |
| | | | | 271/218 |
| 8,366,376 B2 * | 2/2013 | Herrmann | ............ | B65H 31/10 |
| | | | | 198/465.3 |
| 8,376,361 B2 * | 2/2013 | Brewer, III | ............ | B65H 29/60 |
| | | | | 271/176 |
| 9,022,388 B2 * | 5/2015 | Nonaka | ............ | B65H 29/60 |
| | | | | 271/288 |

* cited by examiner

WHEN BUNDLE STACKING COMPLETE OR WHEN IT IS DETECTED THAT THE STACK IS FULL

WHEN BUNDLE STACKING COMPLETE OR WHEN IT IS DETECTED THAT THE STACK IS FULL

SHEET BUNDLE RESTACKING

SHEET BUNDLE RESTACKING

SHEET BUNDLE EJECT

SHEET BUNDLE EJECT

PRINTING DEVICE WITH MIXED SHEET STACKING CONTROL

BACKGROUND OF THE INVENTION

Field of the Invention

The present invention relates to a printing apparatus and a method of controlling the same, and a storage medium.

Description of the Related Art

In a system including a printing apparatus and a post-processing apparatus that executes post-processing on a sheet printed by the printing apparatus, an important requirement is that a large number of printed materials printed by the printing apparatus can be processed efficiently and correctly. In particular, a situation in which a printing speed of the printing apparatus deteriorates under the influence of the operation of the post-processing apparatus must be avoided, and an operating process in which it is difficult for a work mistake to occur in processing of printed material by an operator must be realized.

In Japanese Patent Laid-Open No. 2009-269303, it is disclosed that a discharging destination for sheets that are discharged from the printing apparatus is changed to another apparatus when an instruction to retrieve printed sheets contained in a large-volume stacker apparatus, which is an example of a post-processing apparatus, is input during print processing by the printing apparatus. With this, it is possible to continue a print operation without interrupting print processing by the printing apparatus when retrieving printed sheets from the large-volume stacker apparatus.

In the above-described a printing system including the large-volume stacker and the printing apparatus, a case in which the power supply of the printing system is turned off in a state in which printed sheets exist in the large-volume stacker can be considered. In such a case, if a printed sheet that remains in the large-volume stacker is not removed when the printing system is once again activated, the printed sheet that remains and a sheet printed in the next job will be mixed up within the large-volume stacker when printing is started.

There are printing systems that include a mode for preventing a mixed stacking of printed sheets of differing sizes. However, even if this mode is enabled, when print processing is activated in a state in which a printed sheet remains as described above, a mixed stacking of the sheets will occur if a sheet of the same sheet size as that of the sheet that remains is printed, and it will be impossible to distinguish against the remaining sheet.

SUMMARY OF THE INVENTION

In order to solve the above described problems of the conventional technique, the present invention provides a technique by which it is possible to prevent a mixing of a remaining sheet and a newly printed sheet even when the printing system activates in a state in which a printed sheet remains.

According to one aspect of the present invention, there is provided a printing apparatus capable of printing an image on a sheet, the printing apparatus comprising: a stacker capable of stacking sheets on which images are printed; a detection unit configured to detect that a sheet is stacked in the stacker; and a control unit configured to, upon an activation of the printing apparatus, control so that the sheet stacked in the stacker is moved to a predetermined position where a user can receive the sheet in accordance with the detection unit detecting that the sheet is stacked in the stacker.

According to another aspect of the present invention, there is provided a method of controlling a printing apparatus capable of printing an image on a sheet and having a stacker capable of stacking sheets on which images are printed, the method comprising: detecting that a sheet is stacked in the stacker; and upon an activation of the printing apparatus, controlling so that the sheet stacked in the stacker is moved to a predetermined position where a user can receive the sheet in accordance with being detected that the sheet is stacked in the stacker.

By virtue of the present invention, it is possible to prevent mixing of a remaining sheet and a newly printed sheet even when the printing system activates in a state in which a printed sheet remains.

Further features of the present invention will become apparent from the following description of exemplary embodiments (with reference to the attached drawings).

DESCRIPTION OF THE EMBODIMENTS

Hereinafter, embodiments of the present invention will be described in detail with reference to the accompanying drawings. It should be noted that the following embodiments are not intended to limit the scope of the appended claims, and that not all the combinations of features described in the embodiments are necessarily essential to the solving means of the present invention.

Figure 1A:
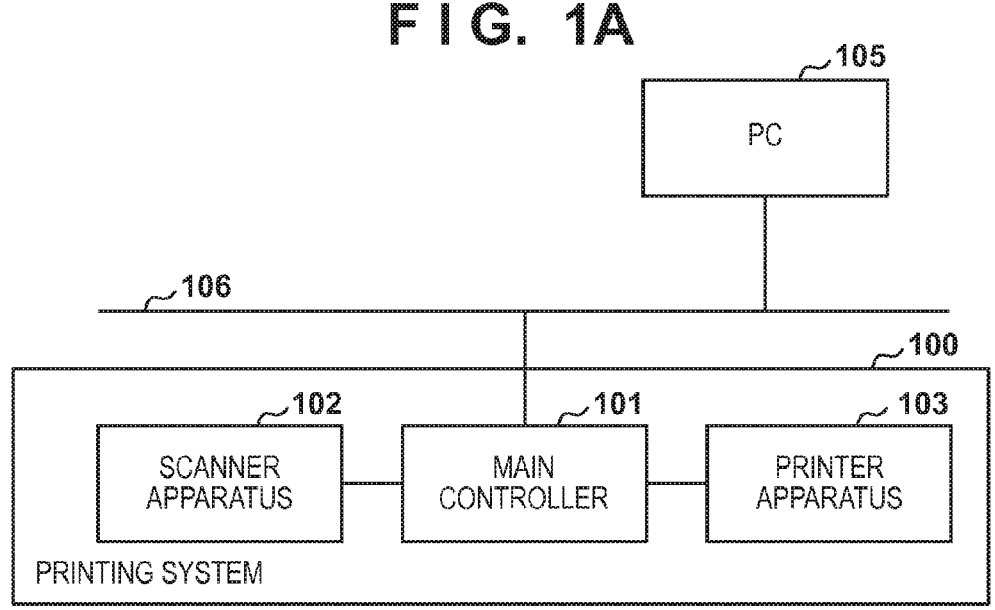
FIG. 1A and FIG. 1B are block diagrams for showing a configuration of a system according to the embodiments.
Figure 1B:
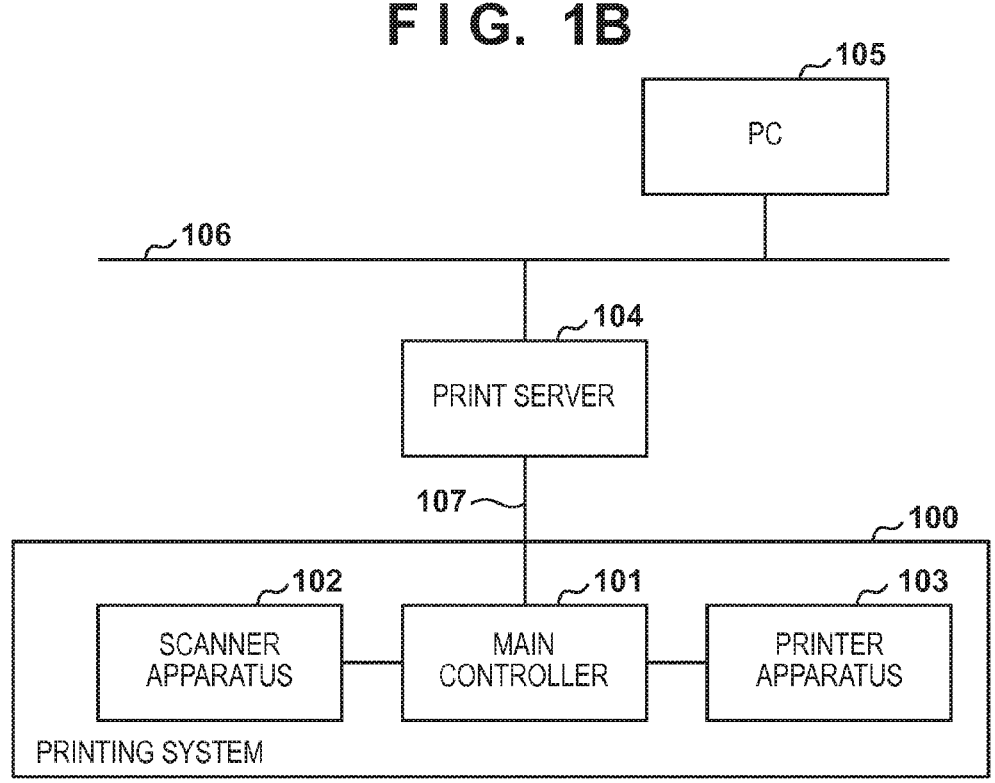

FIG. 1A and FIG. 1B are block diagrams for showing a configuration of a system according to the embodiments.

In FIG. 1A, a printing system 100 includes a main controller 101, a scanner apparatus 102, and a printer apparatus 103. The main controller 101 mainly performs job scheduling control. The scanner apparatus 102 reads originals and outputs image data corresponding to images of those originals. The printer apparatus 103 performs printing of images. Details of the printing system 100 are explained in detail with reference to FIG. 2. Also, the main controller 101 is connected to a PC 105 via a network 106. The PC 105 can input jobs into the main controller 101 using a printer driver (not shown) installed on the PC 105.

FIG. 1B is a block diagram for showing a configuration of a system according to other embodiments, and portions that are common to the previously described FIG. 1A are shown with the same reference numerals, and their explanation is omitted.

In FIG. 1B, a print server 104 is connected between the PC 105 and the printing system 100. The print server 104 first receives a print job input from the PC 105 which is connected to the network 106, and after performing image processing, it inputs jobs into the main controller 101 via a local network 107. Here, configuration is such that from the network 106, the printing system 100 and the print server 104 collectively appear as a single printing apparatus.

Figure 2:
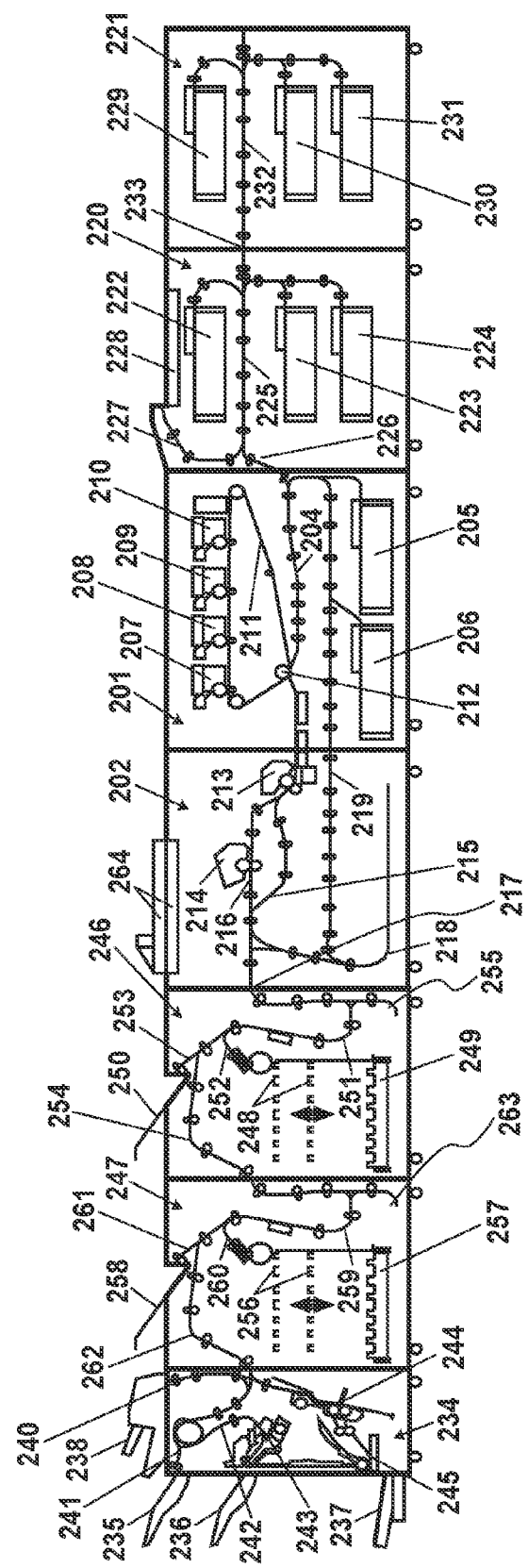
FIG. 2 is a cross-sectional view for showing a configuration of a printing system according to the embodiments.

FIG. 2 is a cross-sectional view for showing a configuration of the printing system 100 according to the embodiments. The printing system 100 includes a printing apparatus, a sheet feeding accessory apparatus, and post-processing apparatuses (large-volume stacker 246 and 247, and a finisher 234).

Reference numeral 201 denotes the printing apparatus main body, and reference numeral 202 denotes an image fixing apparatus. By a printing apparatus main body 201 and an image fixing apparatus 202, printing of images onto sheets (sheets of paper) is performed. The printer apparatus 103 of FIG. 1A and FIG. 1B includes the printing apparatus main body 201 and the image fixing apparatus 202. A large-volume sheet feeding deck 220 is connected on a right side of the printing apparatus main body 201 as a sheet feeding apparatus. The sheet feeding deck 220 can be connected plurally to the printing apparatus main body 201, and furthermore a large-volume sheet feeding deck 221 is connected on the right side in FIG. 2. Also, a large-volume stacker 246 (first stacker) is connected to a left side of the image fixing apparatus 202 as a post-processing apparatus. The large-volume stacker 246 also can be connected plurally, and furthermore on the left side a large-volume stacker 247 (second stacker) is connected. Characteristic control of a post-processing apparatus in the present embodiment is related to control of the large-volume stackers 246 and 247. Furthermore, on the left side of the large-volume stacker 247 the finisher 234 is connected.

Sheet feeding decks 205 and 206 are disposed on the printing apparatus main body 201, and operate as standard sheet feeding units for feeding to the printing apparatus. Reference numerals 207-210 are developing units, and include four stations for Y, M, C, and K for forming color images. Images formed here are primarily transferred to an intermediate transfer belt 211 to form a color toner image. The intermediate transfer belt 211 rotates in a clockwise direction in FIG. 2, and at a secondary transfer position 212 the color toner image is transferred to a sheet that has been conveyed via a sheet conveyance path 204. A sheet to which a toner image is transferred in this way is conveyed from the printing apparatus main body 201 to the image fixing apparatus 202, and by being heated and pressurized by a fixing device 213 of the image fixing apparatus 202, the toner image is fixed to the sheet. A sheet that passes through the fixing device 213 then is conveyed to a discharge orifice 217 through a conveyance path 215. In the case of a sheet for which further heating and pressurization is required in order to fix the image to the sheet, the sheet, having passed through the fixing device 213, is conveyed to a second fixing device 214 using an upper conveyance path, and after additional heating and pressurization is applied, the sheet is conveyed to the discharge orifice 217 through a conveyance path 216. Also, in cases where the image forming mode is that for double-sided printing, a re-feeding of the sheet is performed via a double-sided conveyance path 219 after front/back inversion of the sheet by conveying the sheet to a sheet reversing path 218, and printing is then performed on the second side at a transfer position 212.

Other than the standard sheet feeding units 205 and 206 of the printing apparatus main body 201, it is possible to feed sheets from three sheet feeding decks 222, 223 and 224 of the large-volume sheet feeding deck 220. Sheets fed from here are sent to the printing apparatus main body 201 through sheet conveyance paths 225 and 226, and printing is performed. Also, in the case where a second instance of the large-volume sheet feeding deck 221 is connected, it is possible to feed sheets from three sheet feeding decks 229, 230 and 231. A sheet conveyed along a sheet conveyance path 232 is passed to the first instance of the large-volume sheet feeding deck 220 at reference numeral 233. The large-volume sheet feeding decks 220 and 221 have a function for detecting a double feed in which multiple sheets are conveyed overlappingly. Then when a double feed of sheets is detected, the sheet conveyance path is switched from the normal conveyance path 226 to a conveyance path 227, and the double feed sheets are discharged to an escape tray 228.

Next, explanation will be given for the large-volume stacker 246, which is a post-processing apparatus.

The large-volume stacker 246 has two paper discharge destinations as output destination for sheets: a sheet discharge tray 250, and a stacking unit that is equipped with a lift table 248 and an eject table 249. A sheet to which an image is fixed is conveyed to a sheet conveyance unit of the large-volume stacker 246 through the discharge orifice 217 from the image fixing apparatus 202. The sheet is stacked on the lift table 248 of the stacking unit traveling via a conveyance path 252 from a sheet conveyance path 251. In a state in which no sheet bundle is stacked on the lift table 248, the lift table 248 is positioned on a top side as shown in the figure. When stacking of a sheet bundle proceeds, the lift table 248 lowers by a height corresponding to the sheet bundle that is stacked, and it is controlled so that a top side position of the sheet bundle that is stacked is always at a particular height. If stacking of the sheet bundle in this way completes, or the stack becomes full, the lift table 248 lowers to the position of the eject table 249. Here, the lift table 248 and the eject table 249 are configured so that, even if their heights become equal, respective bars exist at alternate positions. For this reason, when the lift table 248 lowers to reach a position lower than that of the eject table 249, the sheet bundle on the lift table 248 is restacked on the eject table 249. This operation will be explained later in detail with reference to FIG. 3A-FIG. 5F.

Meanwhile, when a sheet is discharged to the sheet discharge tray 250, the sheet is conveyed to the sheet discharge tray 250 via a conveyance path 253 from the sheet conveyance path 251. Furthermore, when the sheet is conveyed to a post-processing apparatus at a subsequent stage in the large-volume stacker 246, the sheet is conveyed via a sheet conveyance path 254, and is conveyed to the second instance of the large-volume stacker 247 or to the finisher 234.

An inversion unit 255 has a mechanism for inverting sheets. In control of the inversion unit 255, a direction of a sheet, at the discharge orifice 217, input into the large-volume stacker 246 is basically controlled so as to be of the same direction as the sheet at the output destination. The configuration is such that, when sheets are stacked on the stacking unit, a sheet, having passed along the conveyance path 252, is flipped and stacked on the lift table 248. Thus, the sheet will be top-bottom reversed in the discharge orifice 217 and the lift table 248 if the sheet is not caused to be inverted by the inversion unit 255. For this reason, control is performed so as to cause the top-bottom direction of the sheet to match in the discharge orifice 217 and the lift table 248 by first causing the sheet to be inverted in the inversion unit 255 when stacking in the stacking unit. When conveying the sheet to the sheet discharge tray 250 or a subsequent post-processing apparatus, a sheet inversion operation is not performed by the inversion unit 255 because the top-bottom direction of the sheet will be the same at the point in time that it is in the discharge orifice 217 because the sheet is discharged as is upon stacking. However, it is possible to perform control so as to forcibly perform an inversion operation with the inversion unit 255 in an exceptional case. Also, an escape unit is provided beyond the inversion unit 255, and it is possible to convey sheets that can be conveyed to the escape unit as much as possible when an abnormal operation such as a jam or an error occurs. Sheets retained on the right side of the conveyance path of the inversion unit 255 that can be conveyed are collected in the escape unit beyond the inversion unit 255.

Note that the configuration of the second instance of the large-volume stacker 247 is exactly the same as the large-volume stacker 246 as described above. Accordingly, each mechanism shown by reference numerals 256-263 is the same as those shown respectively by reference numerals 248-255 of the first instance of the large-volume stacker 246, and their explanations are omitted.

Next, explanation will be given for the finisher 234.

In the finisher 234, post-processing is applied to printed sheets in accordance with a function designated by a user. More specifically, there are functions for stapling (binding at 1 location/2 locations), punching (2 holes/3 holes), saddle stitch bookbinding, or the like. The finisher 234 has sheet discharge trays 235 and 236, and sheets are discharged to a sheet discharge tray 235 via a sheet conveyance path 241. On the sheet conveyance path 241, processing such as stapling cannot be performed. When performing processing such as stapling, sheets are sent to a processing unit 243 via a sheet conveyance path 242, and after the finishing of the function designated by the user is executed, the sheets are discharged to the sheet discharge tray 236. The sheet discharge trays 235 and 236 can move up and down, and it is possible to operate so as to cause the sheet discharge tray 235 to lower, and to stack sheets to which the finishing processing has been performed by the processing unit 243 from a lower discharge orifice.

When an insertion sheet is designated by a user designation, it is possible to cause the insertion sheet, which is set in an inserter 238, to be inserted through a sheet conveyance path 240 for a predetermined page. When saddle stitch bookbinding is designated, a sheet is folded after the central portion of the sheet is stapled by a saddle stitching processing unit 244, and the folded sheet is conveyed to a saddle stitch bookbinding tray 237 via a sheet conveyance path 245. The saddle stitch bookbinding tray 237 is of a conveyor-belt configuration, and configuration is such that a saddle stitch bookbinding bundle stacked on the saddle stitch bookbinding tray 237 is conveyed to the left side.

Next, a scanner 264 (corresponds to the scanner apparatus 102 in FIG. 1A and FIG. 1B) and a document feeder will be explained simply.

The scanner 264 is mainly used for a copy function, but in a case where an original is set on an original platen, and reading of the original is performed, the original is set on the original platen, and a document feeder is closed. Then, when an open/close sensor detects that the original platen is closed, an original size detection sensor of a reflective-type in a housing of the scanner 264 detects the size of the original that is set. The original is irradiated by a light source upon the detection of the size, and the image of the original is read by a CCD. An image signal of the image that is read in this way is converted into a digital signal, and after desired image processing is performed, it is converted into a laser recording signal (image data). The image data converted in this way is stored in the memory of the main controller 101 explained later.

In a case where an original is set in a document feeder and reading is performed, the original is placed face-up in an original setting unit of the document feeder. Then, a sensor for detecting the existence or absence of an original detects that the original is set, and with this an original feed roller and a conveyance belt rotate, thereby conveying the original, and the original is thereby set at a predetermined position on the original platen. After this, the image is read similarly to reading on the original platen, and the image data is stored in memory of the main controller 101.

Next, explanation will be given for an eject operation which is a characteristic operation of the large-volume stackers 246 and 247.

FIG. 3A-FIG. 5F are views for describing operation of a large-volume stacker according to the embodiments. A characteristic operation of the present embodiment is related to a combined operation of the large-volume stackers 246 and 247, but first explanation will be given for a basic operation by one of the large-volume stackers.

Figure 3A:
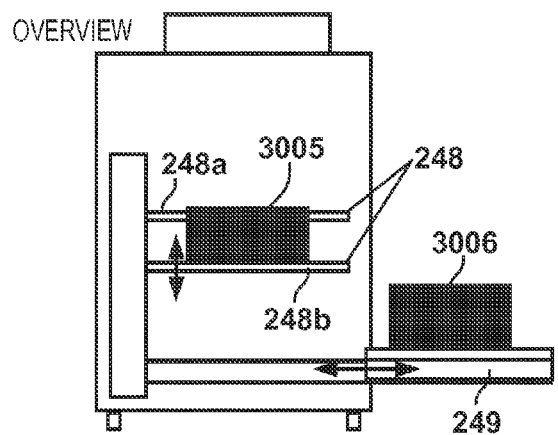
FIG. 3A-FIG. 3F are views for describing operation of a large-volume stacker according to the embodiments.
Figure 3D:
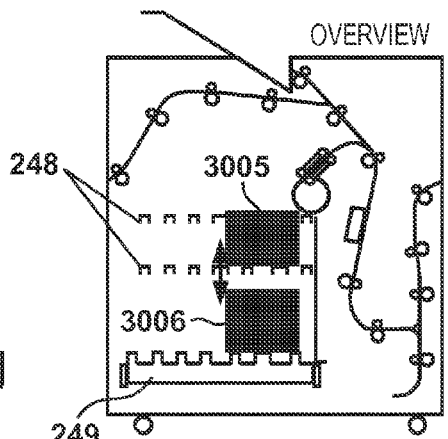
Figure 3B:
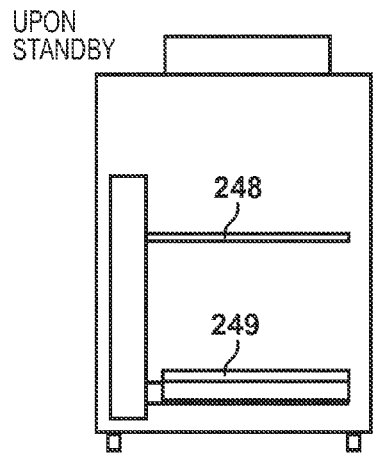
Figure 3E:
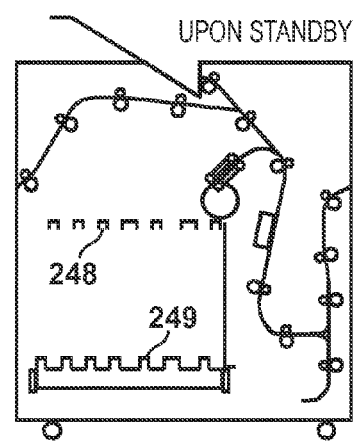
Figure 3C:
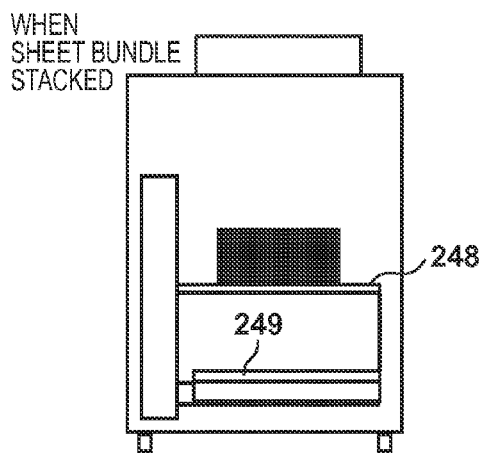
Figure 3F:
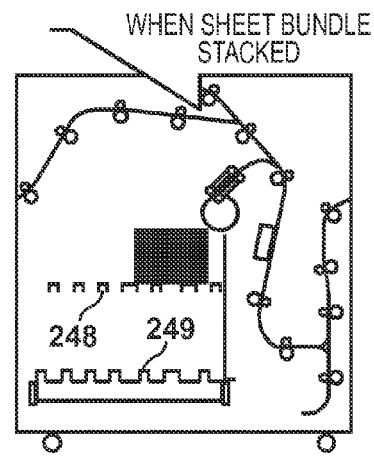

FIG. 3A-FIG. 3C, FIG. 4A-FIG. 4C, and FIG. 5A-FIG. 5C are cross-sectional views from the perspective of a left side surface of the large-volume stacker of FIG. 2, and FIG. 3D-FIG. 3F, FIG. 4D-FIG. 4F, and FIG. 5D-FIG. 5F are cross-sectional views from the perspective of a front surface the large-volume stacker of FIG. 2. Here, FIG. 3A and FIG. 3D are views for describing an overview of the large-volume stacker on the whole, FIG. 3B and FIG. 3E are views for describing a state when the large-volume stacker is in standby, and FIG. 3C and FIG. 3F are views for describing a state in which sheets are being stacked in the large-volume stacker.

The lift table 248 is a table for stacking a sheet bundle in the large-volume stacker. While two tables are shown graphically to exist in FIG. 3A and FIG. 3D, in reality they are one table. A lift table 248a at an upper position shows a position of the lift table 248 when no sheet bundle is stacked, and a lift table 248b at a lower position shows a position of the lift table 248 when a sheet bundle 3005 stacked. In this way, in a state in which the sheet bundle 3005 is stacked, the lift table 248 lowers until a top side of the sheet bundle 3005 is at a position that is the same as the position of the lift table 248a when no sheet bundle is stacked. The eject table 249 is a table for discharging the sheet bundle from the device (the large-volume stacker), to put the sheet bundle in a state such that a user is able to receive it. In a case where no sheet is on the eject table 249, the eject table 249 is in a state in which it is contained within the large-volume stacker. However, when the sheet bundle is restacked from the lift table 248, a sheet existence/absence sensor of the eject table 249 detects that sheets are stacked, and the eject table 249 is ejected (protrudes) from the device.

Explaining in sequence, FIG. 3B and FIG. 3E show the large-volume stacker in a standby state. Because no sheet bundle is stacked on the lift table 248 here, the lift table 248 is stopped at a position (corresponds to reference numeral 248*a* of FIG. 3A) in which it is raised to a maximum which is up to a position of a discharge orifice of a sheet conveyance path which outputs to the stacking unit. Also, the eject table 249 is in a state in which it is contained in the device.

FIG. 3C and FIG. 3F show a state in which, during a print operation of the printing apparatus, the large-volume stacker has received sheets that are discharged from the printing apparatus, and stacked them. When stacking of the sheet bundle proceeds, the print operation by the printing apparatus is executed continuously while causing the lift table 248 to be lowered such that the top side of the sheet bundle matches the position of the discharge orifice of the stacking unit.

Figure 4A:
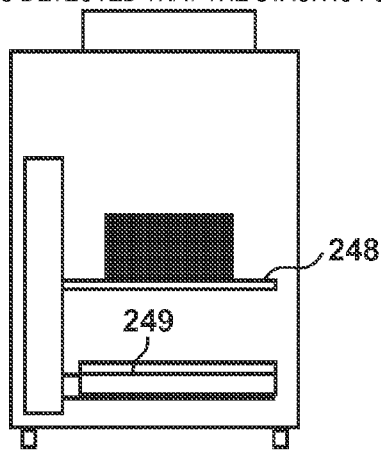
FIG. 4A-FIG. 4F are views for describing operation of a large-volume stacker according to the embodiments.
Figure 4D:
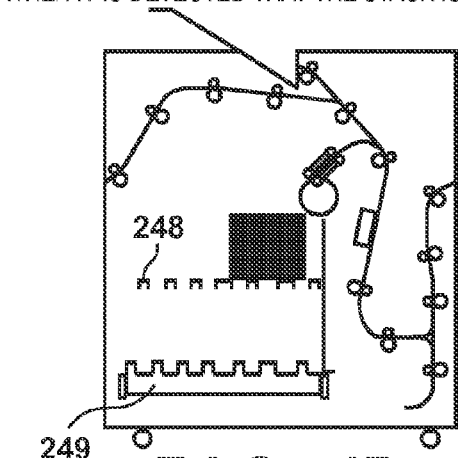
Figure 4B:
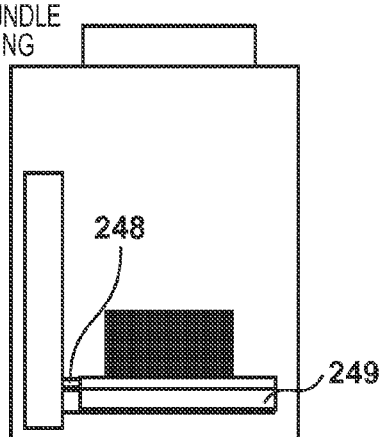
Figure 4E:
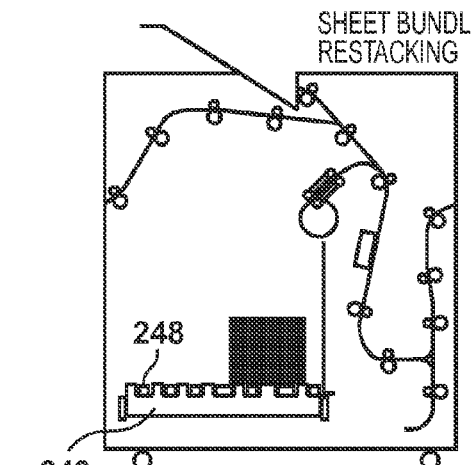
Figure 4C:
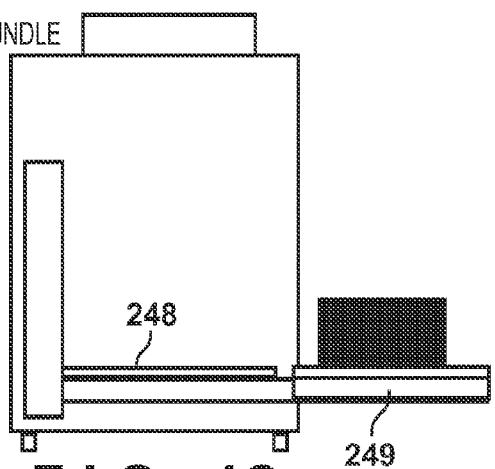
Figure 4F:
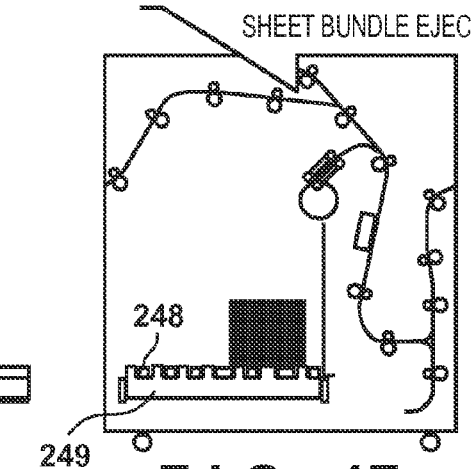

FIG. 4A and FIG. 4D are views for describing a state in the large-volume stacker in which stacking of sheets to the lift table 248 is complete, or the stack is full. FIG. 4B and FIG. 4E are views for describing restacking of a sheet bundle from the lift table 248 to the eject table 249, and FIG. 4C and FIG. 4F are views for describing a state in which the sheet bundle is discharged from the device by the eject table 249.

FIG. 4A and FIG. 4D show a point in time at which stacking of a sheet bundle on the lift table 248 is complete, or a point in time at which it is detected that the stack is full. The point in time at which stacking of the sheet bundle is complete is envisioned to be when retrieving of the sheet bundle is set to match the completion of a job. Accordingly, it does not necessarily mean that the state is such that the sheet bundle reaches the maximum amount that can be stacked in the large-volume stacker. The point in time when it is detected that the stack is full means that the maximum amount that can be stacked has been reached, and no more sheets can be stacked. Note, in the following explanation, when it does not particularly matter whether it is a sheet bundle stacking completion or that the stack is full, it is explained as being a stacking completion.

When the state shown in FIG. 4A and FIG. 4D is entered, it is determined that the operation of stacking sheets on the lift table 248 cannot continue any more. Then, a sheet bundle restacking operation shown in FIG. 4B and FIG. 4E is transitioned to. Here, the lift table 248 is caused to lower to the position of the eject table 249. Here, as shown in FIG. 4E, the lift table 248 is caused to lower until the lift table 248 and the eject table 249 are at the same height. At this time, because the bars of the tables 248 and 249 are at alternate positions, they don't bump into/interfere with each other. When the lift table 248 reaches a position that is lower than the position of the eject table 249, a state in which the sheet bundle stacked on the lift table 248 is restacked on the eject table 249 is entered. In this state, as shown in FIG. 4C, by ejecting the eject table 249 from the device, it is possible to output the sheet bundle stacked on the eject table 249 to the outside of the stacker.

Figure 5A:
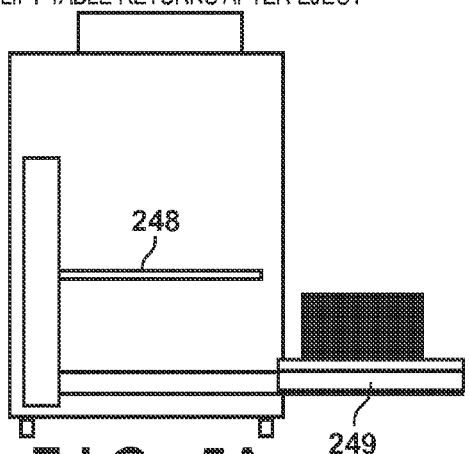
FIG. 5A-FIG. 5F are views for describing operation of a large-volume stacker according to the embodiments.
Figure 5D:
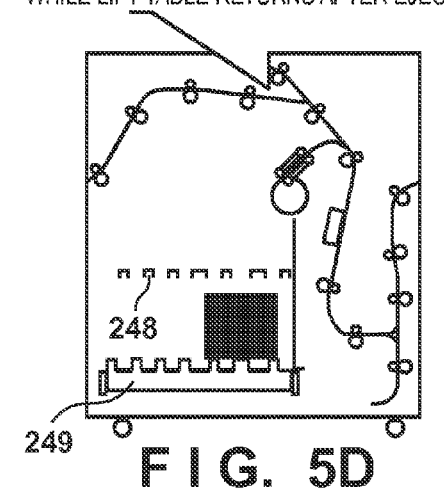
Figure 5B:
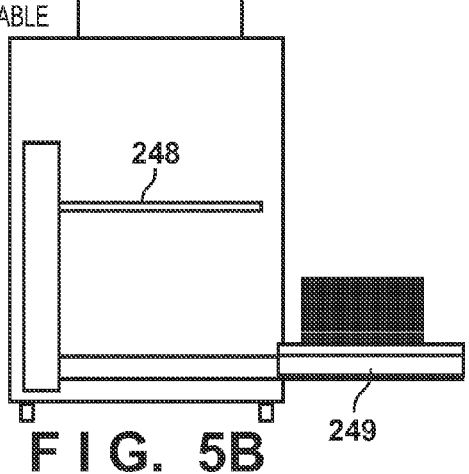
Figure 5E:
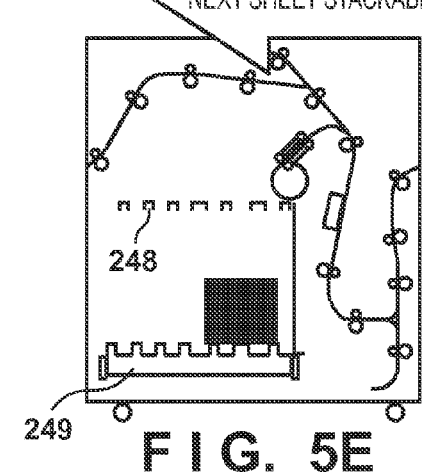
Figure 5C:
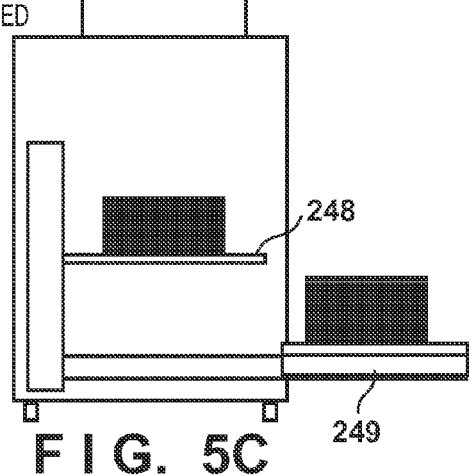
Figure 5F:
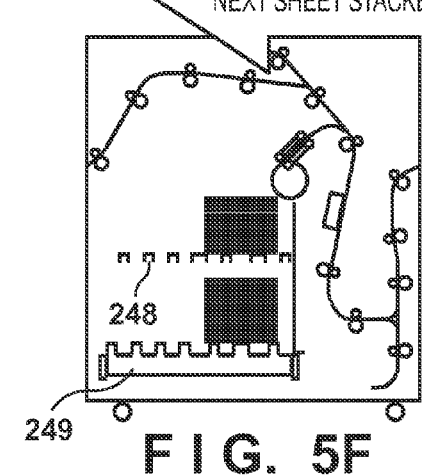

FIG. 5A and FIG. 5D are views for describing a state in which, in the large-volume stacker, the lift table 248 is in the process of returning to an original position while the eject table 249 protrudes from the device. FIG. 5B and FIG. 5E are views for describing a state in which the lift table 248 returns to the uppermost position, and thereby sheets can be stacked. FIG. 5C and FIG. 5F are views for describing a state in which a subsequent sheet bundle is stacked on the lift table 248 in a state in which the eject table 249 protrudes from the device.

As shown by FIG. 4C, when a state in which the eject table 249 protrudes from the device is entered, the lift table 248 once again undergoes a raising operation as is shown in FIG. 5A and FIG. 5D. Then, in FIG. 5B and FIG. 5E, when the lift table 248 returns to the original position at which subsequent sheets can be stacked, the printing apparatus resumes the print operation. When the stacking operation proceeds for sheets printed by the printing apparatus in this way, a state shown in FIG. 5C and FIG. 5F is entered. During the states shown in FIG. 4A-FIG. 5B are entered, the state is such that sheets cannot be stacked on the lift table 248, i.e. a state in which the large-volume stacker cannot receive and stack printed sheets, and this interval lasts for several tens of seconds approximately.

Figure 6:
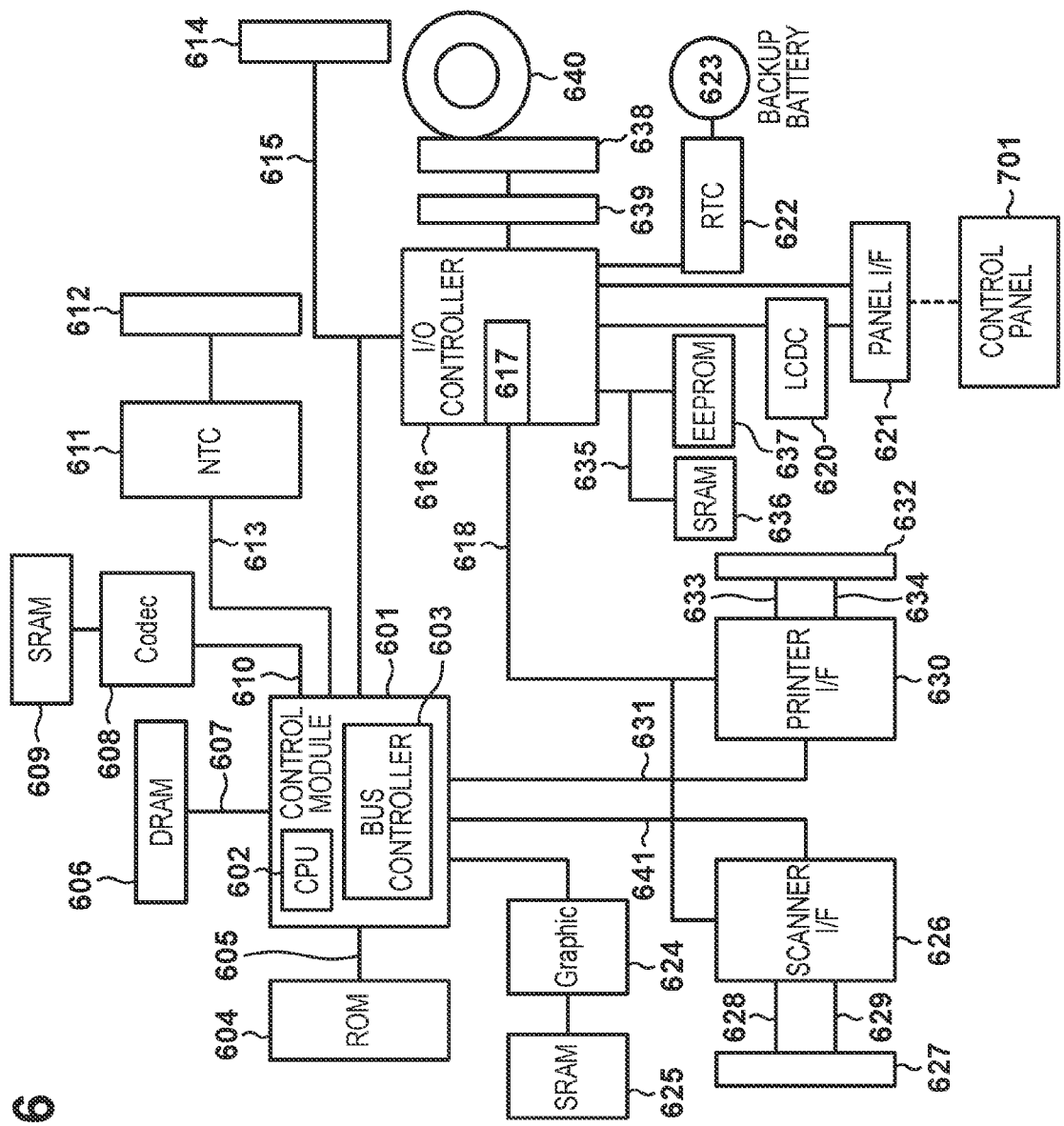
FIG. 6 is a block diagram for explaining a configuration of a main controller of a printing system according to the embodiments.

FIG. 6 is a block diagram for explaining a configuration of the main controller 101 of the printing system 100 according to the embodiment.

A control module 601 includes mainly a CPU 602, a bus controller 603, and various interface (I/F) circuitry. The CPU 602 and the bus controller 603 control the overall operation of the device, and the CPU 602 performs control operations based on programs read from a ROM 604 via a ROM I/F 605. Also, operations for interpreting PDL (page description language) code data received from the PC 105, and extracting raster image data are described in these programs, and are processed by software. The bus controller 603 controls data transfer of data input from I/Fs, and performs control of arbitration during a bus conflict, DMA data transfer, or the like.

A DRAM 606 is connected to the control module 601 by a DRAM I/F 607, and the DRAM 606 is used as a work area for the CPU 602 to operate, as an area for storing image data, or the like. A codec 608 compresses raster image data stored in the DRAM 606 by a format such as MH/MR/MMR/JBIG/JPEG, and conversely decompresses code data that is compressed and stored into raster image data. An SRAM 609 is used as a temporary work area for the codec 608. The codec 608 is connected to the control module 601 via an I/F 610, and transferring of data with the DRAM 606 is controlled by the bus controller 603, and is performed by DMA.

A graphics processor 624 performs processing such as image rotation, image magnification/reduction, color space conversion, and binarization on the raster image data stored in the DRAM 606. An SRAM 625 is used as a temporary work area for the graphics processor 624. The graphics processor 624 is connected to the control module 601 via an I/F, and transfer of data with the DRAM 606 is controlled by the bus controller 603 and is performed by DMA. A network controller (NTC) 611 is connected to the control module 601 by an I/F 613, and is connected to an external network by a connector 612. A common network is Ethernet (registered trademark).

To a general high-speed bus 615, an extension connector 614 for connecting an extension board, and an I/O controller 616 are connected. A common general high-speed bus is a PCI bus. In the I/O controller 616, 2 channels of an asynchronous serial communication controller 617 for transmitting/receiving control commands with the CPUs of the scanner apparatus 102 and the printer apparatus 103 are included. The asynchronous serial communication controller 617 is connected to a scanner I/F circuit 626 and a printer I/F circuit 630 via an I/O bus 618.

Figure 7:
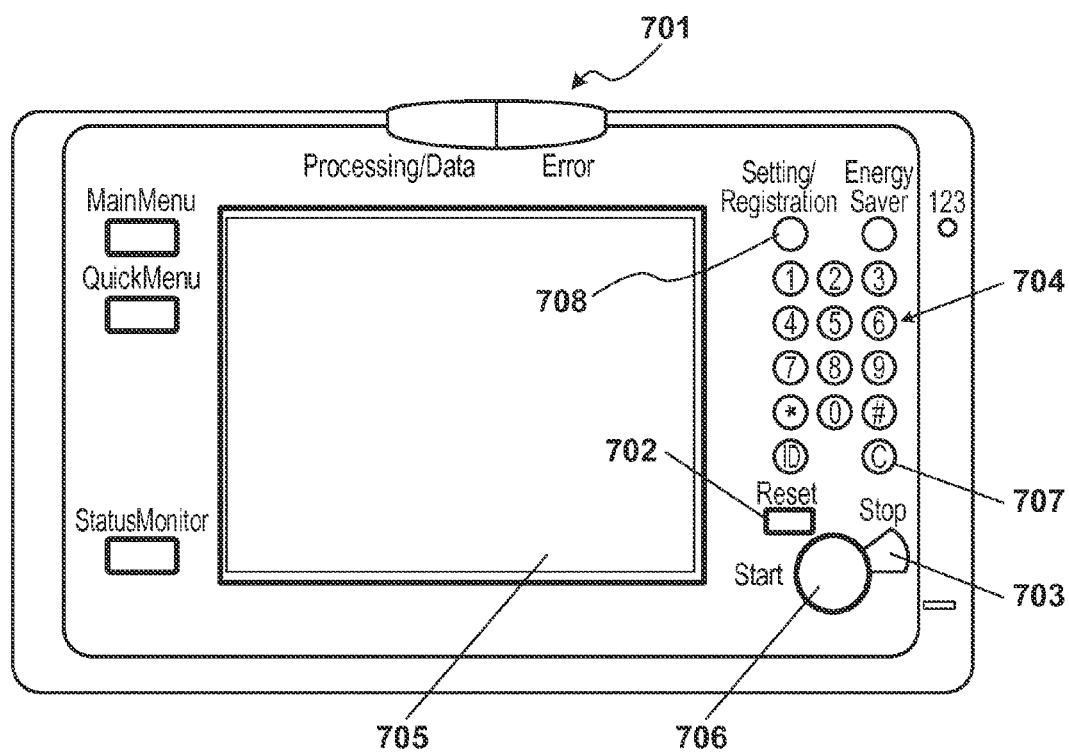
FIG. 7 is a top view for showing a configuration of an operation unit according to the embodiments.

A panel I/F 621 connects a control panel 701 shown in FIG. 7. The panel I/F 621 is connected to a display controller (LCDC) 620, and has an I/F for performing display to screens of a display unit 705 (FIG. 7) of the control panel 701, and a key input I/F for performing hard key and touch panel key input.

A real-time clock module (RTC) 622 is for updating/saving dates and times managed by the printing system 100, and the real-time clock module (RTC) 622 is backed up by a backup battery 623. An E-IDE interface 639 is for connecting an external storage apparatus. In the present embodiment, a hard disk drive 638 is connected via the I/F 639, and the hard disk drive 638 performs operation of storing image data to a hard disk 640 and reading image data from the hard disk 640. Connectors 627 and 632 are connected to the scanner apparatus 102 and the printer apparatus 103 respectively, and are equipped with asynchronous serial I/Fs (628 and 633), and video I/Fs (629 and 634).

The scanner I/F 626 is connected to the scanner apparatus 102 via the connector 627, and is connected with the control module 601 by a scanner bus 641. The scanner I/F 626 has a function for applying predetermined processing to image data received from the scanner apparatus 102, and furthermore, has a function for outputting control signals generated based on video control signals sent from the scanner apparatus 102 to the scanner bus 629. A data transfer to the DRAM 606 from the scanner bus 629 is controlled by the bus controller 603.

A printer I/F 630 is connected to the printer apparatus 103 via a connector 632, and is connected to the control module 601 by a printer bus 631, and the printer I/F 630 applies predetermined processing to image data output from the control module 601 and outputs to the printer apparatus 103. Furthermore, the printer I/F 630 has a function for outputting control signals generated based on video control signals which are sent from the printer apparatus 103, to the printer bus 631. Transfer to the printer apparatus 103 of raster image data extracted into the DRAM 606 is controlled by the bus controller 603, and transfer is performed by DMA to the printer apparatus 103 via the printer bus 631 and the video I/F 634.

An SRAM 636 is configured so as to be able to hold storage contents even if a power shutdown is performed for the printing system 100 by power supplied from a backup battery, and the SRAM 636 is connected to the I/O controller 616 via a bus 635. Also, an EEPROM 637 is similarly connected to the I/O controller 616 via the bus 635.

Next, explanation will be given for the control panel 701 which is for performing various settings.

FIG. 7 is a top view that shows a configuration of the control panel 701 according to the embodiment.

The control panel 701 includes the liquid crystal display unit 705, a touch panel affixed to the liquid crystal display unit 705, and a plurality of hard keys. A signal input by a touch panel or hard keys is transferred to the CPU 602 via the panel I/F 621 which was previously described. The liquid crystal display unit 705 displays image data sent from the panel I/F 621. On the liquid crystal display unit 705, a display of functions for operation of the printing system 100, image data, or the like is displayed.

A reset key 702 is used for cancelling setting values, or the like, that a user has set. A stop key 703 is used when causing a job that is in-operation to stop. A numeric keypad 704 is keys for performing numeric value input such as of a numeric number. The liquid crystal display unit 705 has a touch panel function, and displays various operation screens. On these screens many touch panel buttons for performing various settings exist. A start key 706 is a key for causing a job such as one for reading an original by the scanner apparatus 102 to start. A clear key 707 is a key for clearing settings or the like. Also, an initial setting/registration button 708, a button for performing energy saving, a button for displaying a main menu, a quick menu button by which it is possible to configure a customization screen for each user, and a status monitor button for displaying a state of a device are arranged as hard keys.

First Embodiment

Figure 8:
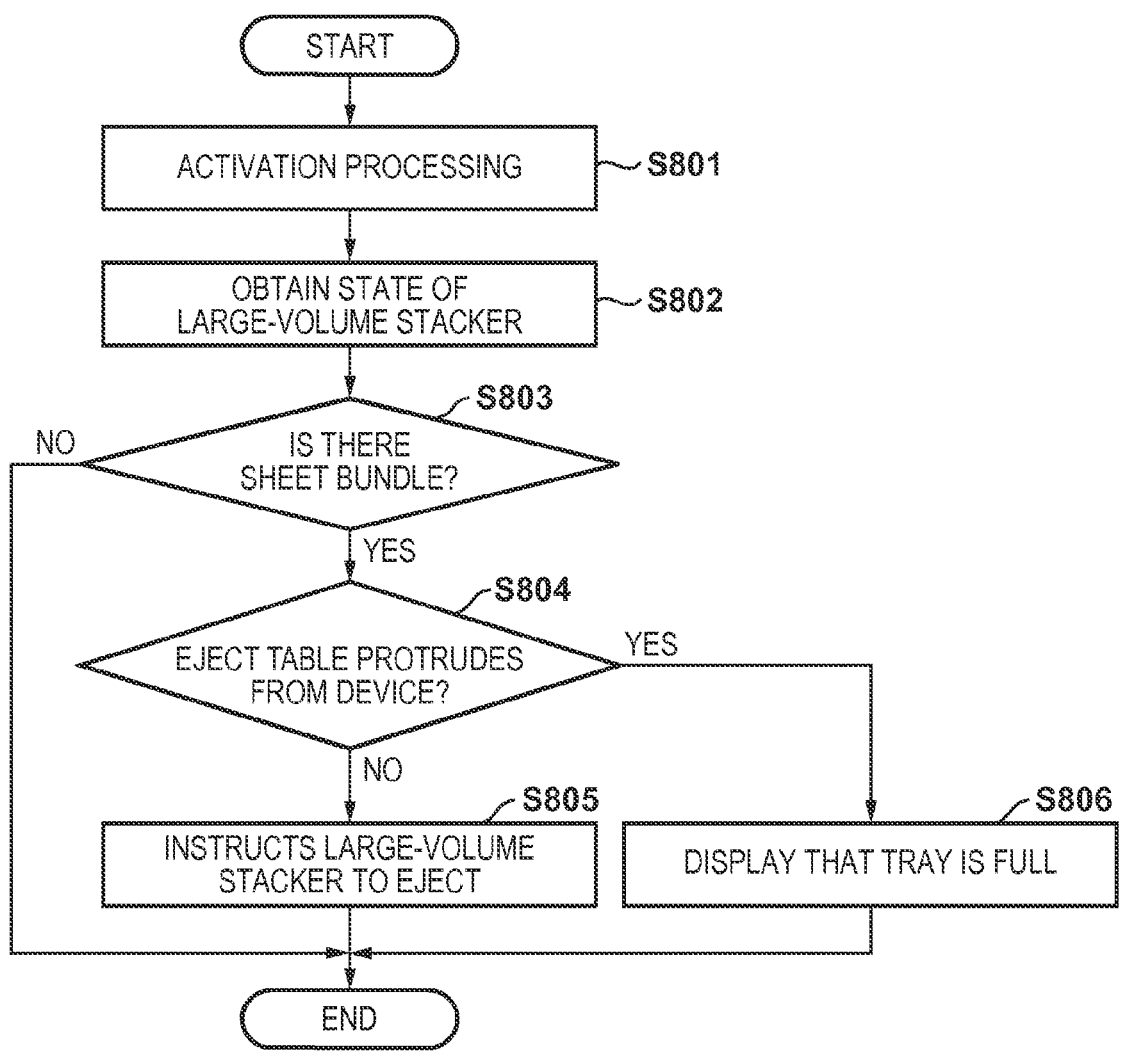
FIG. 8 is a flowchart for describing for control processing by the main controller of the printing system according to the first embodiment.

FIG. 8 is a flowchart for describing control processing by the main controller 101 of the printing system 100 according to the first embodiment. A program for executing this flowchart is stored in the ROM 604, and by the CPU 602 executing this program, the processing shown in this flowchart is realized.

This processing is initiated by turning on the power supply of the printing system 100, and firstly, in step S801, the CPU 602 executes activation processing. Next, the processing proceeds to step S802, and the CPU 602 obtains a state of the large-volume stacker 246 via the printer IF 630. The obtainment of the state of the large-volume stacker 246 here is the obtainment of information related to the large-volume stacker such as whether or not a sheet bundle exists in the large-volume stacker 246, and states of the lift table 248 and the eject table 249. Next, the processing proceeds to step S803, and the CPU 602 determines whether or not a sheet bundle exists in the stacking unit of the large-volume stacker 246 based on the information obtained in step S802. If it is determined that no sheet bundle exists, the processing completes, and if it is determined that a sheet bundle exists, the processing advances to step S804.

In step S804, the CPU 602 determines whether or not the eject table 249 of the large-volume stacker 246 is in a state in which it is ejected to the outside of the large-volume stacker 246 based on the information obtained in step S802. If the eject table 249 of the large-volume stacker 246 is in a state of being ejected from the device, a sheet bundle exists in the stacking unit, and therefore it can be considered that a sheet bundle exists inside the large-volume stacker 246 (on the lift table 248) as well. In other words, it can be considered that the state is as in FIG. 5C. For this reason, the processing proceeds to step S806, and the CPU 602 displays to the control panel 701 that for the large-volume stacker 246 the stack is full, and completes the processing.

Meanwhile, when in step S804 it is determined that the eject table 249 of the large-volume stacker 246 is not ejected outside of the large-volume stacker 246, the processing proceeds to step S805. In step S805, the CPU 602 determines that the state is such that a sheet bundle exists on the lift table 248 of the large-volume stacker 246 (for example, the state in FIG. 3C or FIG. 4A). Then, the CPU 602 instructs to cause the large-volume stacker 246 to execute eject processing via the printer IF 630. With this, the large-volume stacker 246, as shown in FIG. 4B and FIG. 4C, ejects the sheet bundle to the outside of the large-volume stacker 246 after causing the sheet bundle on the lift table 248 to move to the eject table 249. Note that at this time even in a case where for the lift table 248 the stack is not full, the sheet bundle on the lift table 248 is moved to the eject table 249 by causing the lift table 248 to be lowered. Then, by causing the eject table 249 to be ejected from the device, it is possible to output the sheets which remain in the large-volume stacker 246 prior to the power supply of the system being turned on, to the outside of the large-volume stacker 246.

As explained above, by the first embodiment, it is possible to, even in a case where a sheet bundle exists in the large-volume stacker prior to the power supply being turned on, prevent users' printed materials and remaining printed materials from being mixed in the stacker when a user starts a job without noticing the sheet bundle in the stacker.

Note that explanation was given for a case of the large-volume stacker 246, but this can be executed similarly in the case of the large-volume stacker 247.

Second Embodiment

In the first embodiment described previously, eject processing for a case in which a sheet bundle exists in the large-volume stacker when the printing system activates is described. In contrast to this, in the second embodiment, explanation will be given for operation for a case in which eject processing is executed in accordance with a user setting. Note that the configuration of the printing system 100 according to the second embodiment, and the hardware configuration of the main controller 101 are the same as in the previously described first embodiment, and therefore explanation thereof will be omitted.

Figure 9:
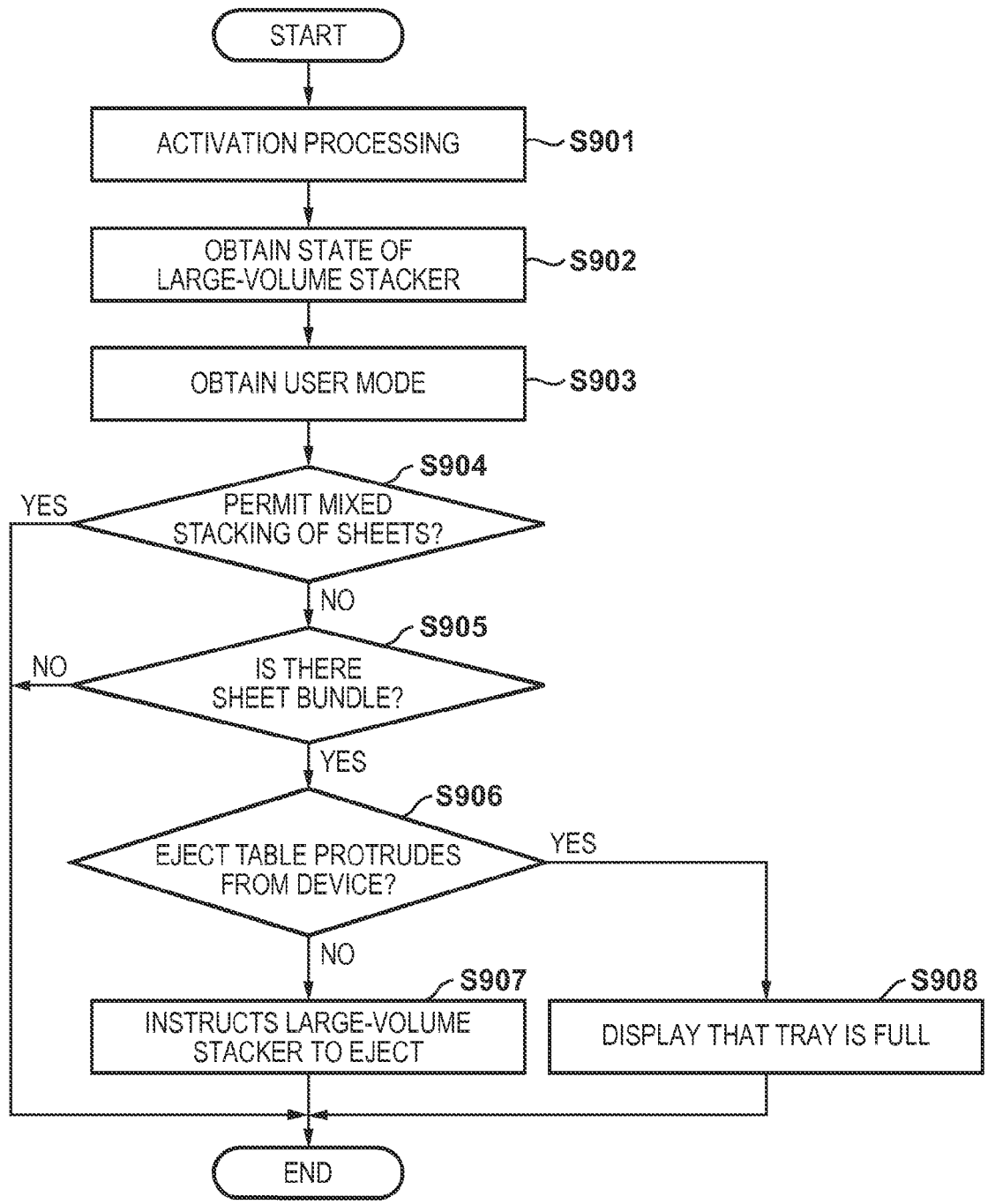
FIG. 9 is a flowchart for describing for control processing by the main controller 101 of the printing system according to a second embodiment.

FIG. 9 is a flowchart for describing control processing by the main controller 101 of the printing system 100 according to the second embodiment. A program for executing this flowchart is stored in the ROM 604, and by the CPU 602 executing this program, the processing shown in this flowchart is realized.

The processing is initiated by the power supply of the printing system 100 being turned on. The processing of step S901 and step S902 is the same as step S801 and step S802 of FIG. 8, and so explanation thereof will be omitted. Next, the processing proceeds to step S903, and the CPU 602 obtains information of a user mode. Here, the information of the user mode that is obtained is information that indicates permission/prohibition of a mixed stacking of sheets in the sheet discharge tray set by a user via an operation screen shown in FIG. 10.

Figure 10:
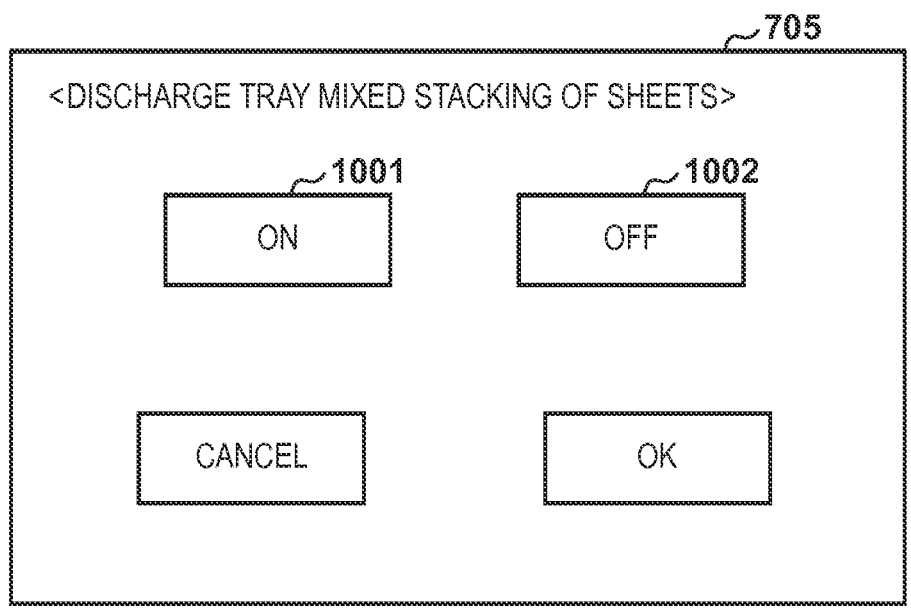
FIG. 10 is a view for illustrating an example of a screen for setting permission/prohibition of a mixed stacking of sheets in a sheet discharge tray which is displayed on a display unit of an operation unit of the printing system according to the second embodiment.

FIG. 10 is a view for illustrating an example of a screen for setting a permission/prohibition of a mixed stacking of sheets in the sheet discharge tray displayed on the display unit 705 of the control panel 701 of the printing system 100 according to the second embodiment.

In the screen of FIG. 10, when a user selects an ON button 1001, a mixed stacking of sheets of differing sizes is permitted on the large-volume stacker, the post-processing apparatus, or the like. Meanwhile, when the user selects an OFF button 1002, a mixed stacking of sheets of differing sizes is prohibited on the large-volume stacker, the post-processing apparatus, or the like (mixed stacking not possible). Note that a user selection result is stored as a flag (ON when mixed stacking is permitted) in the SRAM 609.

In step S904, the CPU 602 determines whether or not mixed stacking of sheets of differing sizes is permitted based on information obtained in step S903. In other words, in the screen of FIG. 10, it is determined whether or not the user selected the ON button 1001 by the previously described flag. Here when it is determined that the flag is ON, i.e. that mixed stacking of sheets of differing sizes is permitted, the processing completes.

Meanwhile, when the CPU 602, in step S904, determines that mixed stacking of sheets of differing sizes is not permitted (the flag is OFF), the processing proceeds to step S905, and the CPU 602 determines whether or not a sheet bundle exists in the stacking unit of the large-volume stacker based on the information obtained in step S902. Here, the processing of step S905-step S908 is the same as the processing of step S803-step S806 of previously described FIG. 8, and so explanation thereof is omitted.

As explained above, by the second embodiment, it is possible to, even in a case where a sheet bundle exists in the stacker prior to the power supply being turned on, prevent users' printed materials and remaining printed materials from being mixed in the stacker when a user starts a job without noticing the sheet bundle in the stacker. Also, at this time, if the user permits mixed stacking of sheets of differing sizes, it is possible to execute printing in a state in which mixed stacking with remaining printed materials is permitted.

Note that in the above described first and second embodiments explanation was given for an example of a printing system in which a stacker is connected to the printing apparatus, but of course it is also possible to apply this to a printing apparatus having a stacker.

Also, in the above described first and second embodiments, explanation was given for an example of a large-volume stacker as one example of a post-processing apparatus, but this can be applied to a post-processing apparatus such as a bookbinding device or a folding device in a case where sheets printed based on a previous job remain, for example.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-170900, filed Aug. 25, 2014, which is hereby incorporated by reference herein in its entirety.

What is claimed is:

1. A printing apparatus comprising:
   a printer configured to print an image on a sheet based on a print job;
   a stacker capable of stacking the sheet having been conveyed from the printer;
   a detection unit configured to detect an existence or an absence of the sheet in the stacker; and
   a controller configured to, when the printing apparatus is powered on, control the stacker to execute an eject process for ejecting the sheet in the stacker based on the existence of the sheet in the stacker being detected by the detection unit, wherein the eject process is executed without an execution request for a print job.

2. The printing apparatus according to claim 1, further comprising:
   a setting unit configured to set a permission or a prohibition of a size mixed stacking of sheets in the stacker,
   wherein the controller controls, in a case where the setting unit sets the prohibition of the size mixed stacking of sheets in the stacker, so that the sheet stacked in the stacker is moved to a predetermined position where a user can receive the sheet in accordance with the detection unit detecting that the sheet is stacked in the stacker.

3. The printing apparatus according to claim 1, wherein the stacker comprises:
   a lift table that receives sheets that are conveyed from the printer and stacks the received sheets; and
   an eject table that receives a bundle of sheets stacked on the lift table and stacks the received bundle of sheets.

4. The printing apparatus according to claim 3, wherein the controller moves the eject table so that the stacked bundle of sheets is moved to a predetermined position.

5. The printing apparatus according to claim 3, wherein the lift table moves vertically, and
   the eject table moves horizontally.

6. The printing apparatus according to claim 1, wherein the eject process includes a process for moving a table on which the sheet is stacked to a position where a user can receive the sheet.

7. A method of controlling a printing apparatus having a stacker capable of stacking sheets, the method comprising:
   conveying the sheet from the printer to a stacker;
   stacking the sheet on the stacker;
   detecting an existence or an absence of the sheet is stacked in the stacker; and
   when the printing apparatus is powered on, controlling the stacker to execute an eject process for ejecting the sheet in the stacker based on the existence of the detected sheet in the stacker, wherein the eject process is executed without an execution request for a print job.

8. A non-transitory computer-readable storage medium storing a computer program for causing a computer to execute a method of controlling a printing apparatus having a stacker capable of stacking sheets, the method comprising:
   conveying the sheet from the printer to a stacker;
   stacking the sheet on the stacker;
   detecting an existence or an absence of the sheet in the stacker; and
   when the printing apparatus is powered on, controlling the stacker to execute an eject process for ejecting the sheet in the stacker based on the existence of the detected sheet in the stacker, wherein the eject process is executed without an execution request for a print job.

* * * * *